United States Patent
Nachtmann (10) Patent No.: US 10,006,497 B2
(45) Date of Patent: Jun. 26, 2018

(54) ROTOR-INTEGRATED SEPARATING CLUTCH WITH TWO-STAGE CLUTCH TRANSMISSION

(71) Applicant: Schaeffler Technologies AG & Co. KG, Herzogenaurach (DE)

(72) Inventor: Florian Nachtmann, Strassburg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 254 days.

(21) Appl. No.: 14/911,986

(22) PCT Filed: Aug. 1, 2014

(86) PCT No.: PCT/DE2014/200371
§ 371 (c)(1),
(2) Date: Feb. 12, 2016

(87) PCT Pub. No.: WO2015/021976
PCT Pub. Date: Feb. 19, 2015

(65) Prior Publication Data
US 2016/0195142 A1    Jul. 7, 2016

(30) Foreign Application Priority Data
Aug. 14, 2013 (DE) .................... 10 2013 216 082

(51) Int. Cl.
*F16D 13/44* (2006.01)
*F16D 13/50* (2006.01)
(Continued)

(52) U.S. Cl.
CPC .............. *F16D 13/44* (2013.01); *B60K 6/387* (2013.01); *F16D 13/50* (2013.01); *H02K 7/108* (2013.01); *Y10S 903/914* (2013.01)

(58) Field of Classification Search
CPC .......... F16D 13/40–13/50; F16D 23/12; B60K 6/38; B60K 6/387; B60K 6/48;
(Continued)

(56) References Cited

U.S. PATENT DOCUMENTS

| 6,016,897 A | 1/2000 | Bacher |
| 6,814,205 B2 * | 11/2004 | Feldhaus ................ F16D 13/72 180/165 |
| 2013/0281258 A1 * | 10/2013 | Reitz ...................... B60K 6/383 477/5 |

FOREIGN PATENT DOCUMENTS

| CN | 103223859 A | 7/2013 |
| DE | 102009010136 A1 | 9/2009 |

(Continued)

*Primary Examiner* — Richard M Lorence
(74) *Attorney, Agent, or Firm* — Brooks Kushman P.C.

(57) ABSTRACT

A rotor-integrated disconnect clutch for a hybrid module with a rotor, comprising a clutch disc axially arranged to be non-rotatably secured between a counter plate and an axially movable pressure plate, wherein a first lever element such as a diaphragm spring is pivotable about a bearing point and in operative connection with the pressure plate, for instance via a pressure plate tab, to transmit force, wherein an actuator such as an electrical concentric actuator for at least indirectly causes the first element to pivot about the bearing point, wherein a second lever element is disposed between the first actuator and the first lever element to have a force transmitting effect there between. The invention further relates to a drive train including a hybrid module with a disconnect clutch of this type.

17 Claims, 5 Drawing Sheets

(51) Int. Cl.
*B60K 6/387* (2007.10)
*H02K 7/108* (2006.01)

(58) Field of Classification Search
CPC .... H02K 7/006; H02K 7/108; Y02T 10/6221; Y10S 903/914
See application file for complete search history.

(56) References Cited

FOREIGN PATENT DOCUMENTS

| | | | |
|---|---|---|---|
| DE | 102009032331 A1 * | 2/2010 | ............ F16D 13/50 |
| DE | 102011087334 A1 | 6/2012 | |
| DE | 102012207325 A1 | 11/2012 | |
| DE | 102012221515 A1 | 6/2013 | |
| FR | 2753756 A1 | 3/1998 | |
| SU | 1237812 A1 | 6/1986 | |
| WO | 2010084024 A1 | 7/2010 | |
| WO | 2012159598 A1 | 11/2012 | |

* cited by examiner

Fig. 6

ROTOR-INTEGRATED SEPARATING CLUTCH WITH TWO-STAGE CLUTCH TRANSMISSION

CROSS-REFERENCE TO RELATED APPLICATIONS

The present application is the U.S. national stage application pursuant to 35 U.S.C. § 371 of International Application No. PCT/DE2014/200371, filed Aug. 1, 2014, which application claims priority from German Patent Application No. DE 10 2013 216 082.8, filed Aug. 14, 2013, which applications are incorporated herein by reference in their entireties.

TECHNICAL FIELD

Disclosed herein is a rotor-integrated disconnect clutch for a hybrid module, where a rotor is provided, including a clutch disc axially disposed to be non-rotatably secured between a counter plate and an axially movable pressure plate. A first lever element such as a diaphragm spring, which is pivotable about a bearing point, is in force-transmitting operative connection with the pressure plate via a pressure plate tab. An actuator such as an electrical concentric actuator (EZA) is provided at least indirectly or directly to cause the first lever element to pivot about the bearing point. The actuator might also be referred to as an operating device.

BACKGROUND

Hybrid modules for drive train designs of motor vehicles are known in the art. DE 10 2011 087 334 A1, for instance, discloses a hybrid module for a drive train of a vehicle including a combustion engine and a transmission. The hybrid module is effective between the combustion engine and the transmission and includes an electric drive, a disconnect clutch, and a freewheel. The disconnect clutch and the freewheel are provided in parallel to transmit torque from the combustion engine in the direction of the transmission. The freewheel transmits torque from the combustion engine in the direction of the transmission and opens when torque is applied in the reverse direction. A proportion of the torque generated by the combustion engine and transmitted by the freewheel is adjustable by adjusting a torque that is transmittable by the disconnect clutch. Thus the vehicle is selectively drivable by the combustion engine, by the electric drive, or by both in combination at the same time. In this context, a combustion engine is understood to be an internal combustion engine.

An integration of the clutch into the rotor of an electric motor usually results in a compact hybrid module. The current state of the art for the development of rotor-integrated clutches is a push-type clutch with a force-controlled adaptation to wear (SAC).

However, the known solutions only have a small load ring volume because the inner region of the disconnect clutch is occupied by the electrical concentric actuator and is not available for accommodating the diaphragm spring. The release diameter is approximately at the center of a tube. The rotor is fixed to the tube. In this context, the load ring volume is understood to be the volume defined by the radially outer region of the diaphragm spring, i.e., the volume of the region that acts to transmit force, namely to a bearing location and/or directly or indirectly, for instance via a pressure tab, to a pressure plate. The tube center is the radially innermost region inside the rotor, because in general the said tube is attached to the rotor or vice versa. The further components of the disconnect clutch are then at least partly fixed or mounted to the tube.

In addition, known push-type clutch assemblies suffer from a lamentably low transmission rate and from a small leaf spring pitch circle due to the presence of outer tabs and the leaf springs located underneath, i.e., radially inside.

In particular if integrated SAC readjustment is provided, no further reduction of the interior diameter of the rotor is possible.

SUMMARY

An object of the rotor-integrated disconnect clutch of is to be able to transmit torque from a combustion engine to a transmission and/or to start the combustion engine with an electric motor of the hybrid module. In addition, the disconnect clutch should be able to completely decouple the internal combustion engine from the drive train to allow recuperation and/or electric driving.

In an exemplary embodiment, a disconnect clutch is provided that is capable of transmitting twice or at least two and a half times the torque that is common so far while selecting a common slip safety factor. In particular, torque in the amounts of 300 Nm, 400 Nm and more are to be transmittable without necessarily having to fall back on a two-disc clutch and/or to use a freewheel. Despite the fact that the tube diameters are smaller than they have been heretofore, considerably higher torques (twice or two and a half times the usual torque) are to be transmitted. High torques are thus to be transmittable while the interior rotor diameter remains small. Optimum use is to be made of the limited radial installation space to generate high pressing forces even when only a single clutch disc is used.

A further object is to minimize the axial and radial installation space requirements of the disconnect clutch.

Advantageously, in an exemplary embodiment, the hybrid module includes a rotor-integrated disconnect clutch provided therein.

Integrating a clutch into a rotor of an electric motor provides a compact hybrid module. The current state of the development of rotor-integrated clutches focuses on a push-type clutch including a diaphragm spring with fingers. Some of them use force-based wear readjustment devices, also referred to as SAC devices. The clutch is opened and closed via diaphragm spring fingers by a movement of the electrical concentric actuator in the direction of the central flange. The diaphragm spring consists of two functional units, usually the load ring and the fingers.

The load ring acts to generate the pressing force while the clutch is actuated by the diaphragm spring fingers. At a predefined pressing force, the release force is essentially defined by the clutch transmission ratio. The length of the diaphragm spring fingers has a considerable influence on which clutch transmission ratio may be implemented. This arrangement may be referred to as a radially nested arrangement because the components for generating force and for operating the clutch need to share the available radial installation space.

The radially nested arrangement of force-generating and clutch operation components has a number of disadvantages: what is to be lamented is a small load ring volume and the resultant comparatively low maximum pressing force that may be achieved. Here, too, the clutch transmission ratio is unfortunately smaller than would be desirable. The maximum transmittable torque without active traction is thus limited.

A fundamental object is to allow a rotor-integrated clutch to be capable of transmitting torque from the internal combustion engine to the transmission on the one hand, and on the other hand to make it possible for the internal combustion engine to be started by means of the electric motor of the hybrid module. In addition, the clutch should disconnect the internal combustion engine completely from the drive train to allow recuperation and electric driving.

In accordance with the invention, this object is attained by providing a second force-transmitting lever element between the actuator and the first lever element. To operate the rotor-integrated disconnect clutch, a lever spring and a diaphragm spring are disposed one behind the other, resulting in an axially nested arrangement of the clutch transmission.

Advantageous embodiments are claimed in the dependent claims and will be explained in more detail below.

In an exemplary embodiment, the second lever element may be designed to be a spring-elastic element, for instance of the type of a weak lever spring that only ensures an abutment between the second lever element and two adjacent components. This avoids clutch rattle and thus no undesired noises occur. A comparatively high torsional stiffness should be present and simultaneously a small torque should be generated to ensure contact.

Advantageously, in an exemplary embodiment, a first contacting region of an annular coupling element abuts against a force introduction region of a radially outer end of the first lever element and a second contacting region abuts against the region of a radially outer end of the second lever element. This may be a useful enhancement of the lever ratios to make a particularly high level of force attainable. This results in a very high transmission ratio, resulting in a release force that is easily controllable and reducible.

Advantageously, in an exemplary embodiment, a bearing ring having a dome may abut against a radially inner end region of the first lever element, defining the bearing point at this location.

An advantageous exemplary embodiment is also characterized in that the pressure plate tab abuts against the first lever element side facing away from the second lever element in a (diaphragm) spring-induced way approximately at the center between the bearing point and the force introduction region.

Advantageously, in an exemplary embodiment, is that at least in the axial direction, the bearing ring is fixed to a central flange via a securing element, for instance a securing ring.

Assembly is simplified if the coupling element is embodied as a sleeve adjacent to the rotor, with the two contacting regions formed on the ends of the sleeve so as to point towards one another, trapping both radially outer ends of the two lever elements axially in between. This avoids flawed shifting processes.

Optimum use may advantageously be made of the installation space if a lever bearing surface is disposed approximately at the center of the second lever element and/or axially between the two lever elements.

It is particularly efficient if the two lever elements are disposed in such a way that they implement a two-stage and/or axially successive clutch transmission.

In an exemplary embodiment, it is advantageous to arrange the lever bearing surface on the rotor or on a tube fixed to the rotor, for instance by pins, in a way to be fixed against relative rotation. The lever bearing surface, for instance a lever bearing ring, is pinned/dowelled to the tube.

The invention further relates to a drive train with a hybrid module that includes a stator and a rotor as well as an internal combustion engine. An integrated disconnect clutch of the invention is provided.

Clutch actuation preferably occurs by means of an electrical concentric actuator because apart from the control unit, such a solution does not require any installation space outside the disconnect clutch. However, the maximum attainable actuating force of the electrical concentric actuator is limited by the installation space available for the stator of the electrical concentric actuator and a deflection gear.

In an exemplary embodiment, the torque capacity of the rotor-integrated disconnect clutch can be considerably increased compared to the prior art. In addition, much greater transmission ratios may be implemented. In any case, the invention provides a design of a rotor-integrated clutch that has particularly small interior rotor diameters. A rotor-integrated clutch with a two-stage clutch transmission as well as a pull-type fingerless diaphragm spring that is supported on a flange on an inner side of the rotor may be used in other exemplary embodiments.

A pressure plate is provided with tabs. The tabs may face the center of the tube. It is likewise possible for the pressure plate tabs to extend through passages in the central flange.

Radially outer leaf springs disposed between the pressure plate tabs and the tube are also advantageous. A lever spring/a lever may be used in connection with a coupling element for reversing a pull-type clutch actuation into a push-type clutch actuation on the release diameter of the electrical concentric actuator. A lever bearing surface dowelled in the tube as well as cutouts in the lever bearing surface for the coupling element to pass through are implementable.

The construction is further characterized in that a bearing of a fingerless diaphragm spring is implemented on the load ring interior with the aid of a securing ring in the central flange. Actuation of the diaphragm spring is effected by pulling on the outer rim of the load ring by means of a coupling element. A bearing of the lever spring is achievable by a flange dowelled in the tube. The favored arrangement is an axially nested arrangement of a lever spring and a fingerless diaphragm spring.

Together with the bearing of the diaphragm spring on the inner side of the central flange and the pull-type actuation of the outer side of the diaphragm spring the pressure plate tabs facing the center of the tube result in a first clutch transmission ratio $i_1$.

A second clutch transmission ratio $i_2$ is provided by the lever spring. The total transmission ratio is calculated as $i_{tot} = i_1 \times i_2$.

The lever spring ratio is selectable over a wide range by changing the position of the dome that contacts the respective lever. The transmission ratio of the entire system may then be varied in accordance with the torque. Small transmission ratios for small torques, i.e. a low pressing force, may be implemented, i.e., short electric motor lengths. Large transmission ratios at high torques, i.e., a high pressing force, may be implemented, in particular with long electric motors.

The clutch transmission ratio has a decisive influence on the range of movement of the release system and thus has an immediate effect on the installation space requirements of the clutch system including the actuator.

The variable transmission ratio of the clutch allows a modular construction (system) to be implemented where a basic structure comprising the elements of pressure plate, flange, diaphragm spring bearing, lever bearing surface, coupling element etc., may attain the same maximum release force at varying pressing forces by varying a component, in particular the lever spring.

Using a conventional rotor, this arrangement easily allows transmission ratios (in terms of $i_{tot}$) of 2 to 6 to be implemented.

Arranging a clutch for a rotor-integrated hybrid disconnect clutch in the way described above allows high pressing forces on the one hand and large transmission ratios on the other hand to be implemented.

A fingerless diaphragm spring is opened by a pulling force exerted by a coupling element. The pressure plate tab is disposed between the diaphragm spring bearing and the coupling element. This results in a first clutch transmission ratio $i_1$. The first subsystem corresponds to a pull-type clutch that is supported on the inside and actuated on the outside.

A lever spring reverses the pull-type actuation of the diaphragm spring into a push-type actuation.

The transmission ratio $i_2$ of the lever spring allows a high transmission ratio $i_{tot}$ to be implemented. Suitable variation of the release diameter of the lever spring/lever is sufficient to vary the total transmission ratio while the basic structure remains identical.

The axially nestled arrangement of actuation and generation of force further allows a large load ring to be used and the interior diameter of the rotor to be reduced. The radially outer arrangement of the leaf springs between the tube and the tab allows high torques to be transmitted to the pressure plate.

The invention may be further developed as a rotor-integrated disconnect clutch for a hybrid module comprising a rotor, a clutch disc provided radially inside the rotor and axially disposed between a pressure plate and a counter plate, a lever spring of a diaphragm-spring type disposed radially inside the rotor, and in force-transmitting operative connection with the pressure plate in a place of contact via a transmission element such as a pressure tab, where the diaphragm spring is supported on a bearing region of a component that is fixed to the rotor and radially to the inside thereof an actuating device acts on a diaphragm spring finger in a force-transmitting way to force the diaphragm spring to be displaced or to tilt, causing the pressure plate to move in an axial direction and/or the region of contact of the diaphragm spring and the transmission element to be disposed radially between the bearing region and the finger.

The invention will be explained in more detail below with the aid of a drawing illustrating an exemplary embodiment.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
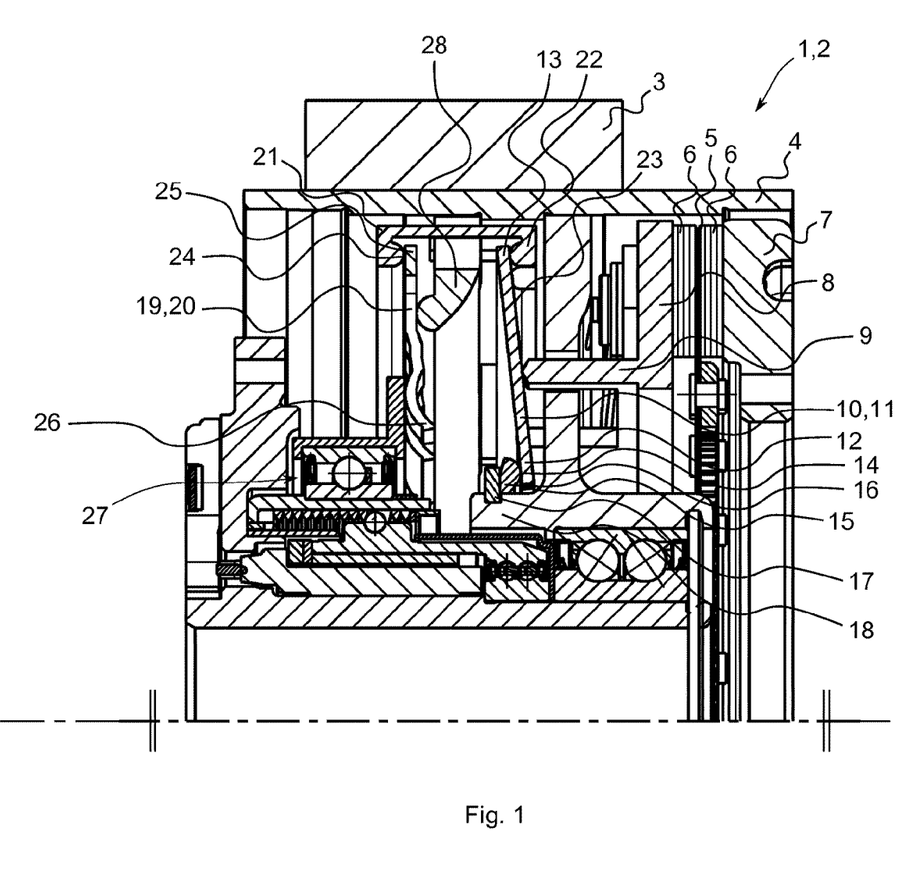
FIG. 1 is a cross-sectional view of an exemplary embodiment of a rotor-integrated disconnect clutch including a two-stage transmission.

FIG. 1 illustrates a first embodiment of rotor-integrated disconnect clutch 1. Disconnect clutch 1 is used in hybrid module 2. The main components of disconnect clutch 1 are disposed radially inside rotor 3. On the inner side of rotor 3, tube 4 is provided for co-rotation with rotor 3. Clutch disc 5 having friction linings 6 on both sides is disposed radially inside the tube so as to be non-rotatably secured between counter plate 7 fixed to the rotor and axially movable pressure plate 8. Pressure plate 8 is moved towards counter plate 7 by the introduction of a force via pressure plate tab 9. Pressure plate tab 9 is an integral part of pressure plate 8.

Pressure plate tab 9 contacts a central region of first lever element 10 embodied as diaphragm spring 11. This central region is disposed between radially inner end 12 and radially outer end 13 of diaphragm spring 11.

In bearing point 14, first lever element 10 contacts dome 15 of rounded shape that is part of bearing ring 16. Bearing ring 16 is fixed to central flange 18 via securing ring 17. Second lever element 19 is embodied as lever spring 20 and is in operative connection with first lever element 10 via coupling element 21. Coupling element 21 has first contacting region 22. Distal to the pressure plate tab, first contacting region 22 is engaged by first surface 23 of first lever element 10, said first surface 23 facing pressure plate tab 9. Second contacting region 24 engages radially outer end 25 of second lever element 19. On a side facing the pressure plate tab, radially inner end 26 of second lever element 19 is engaged with actuating device 27. Actuating device 27 may be referred to as an actuator and may be embodied as a concentric slave cylinder, in particular as an electrical concentric actuator. Between radially outer end 25 and radially inner end 26, second lever element 19 is engaged with lever bearing surface 28, which may also be referred to as a lever bearing ring.

Figure 2:
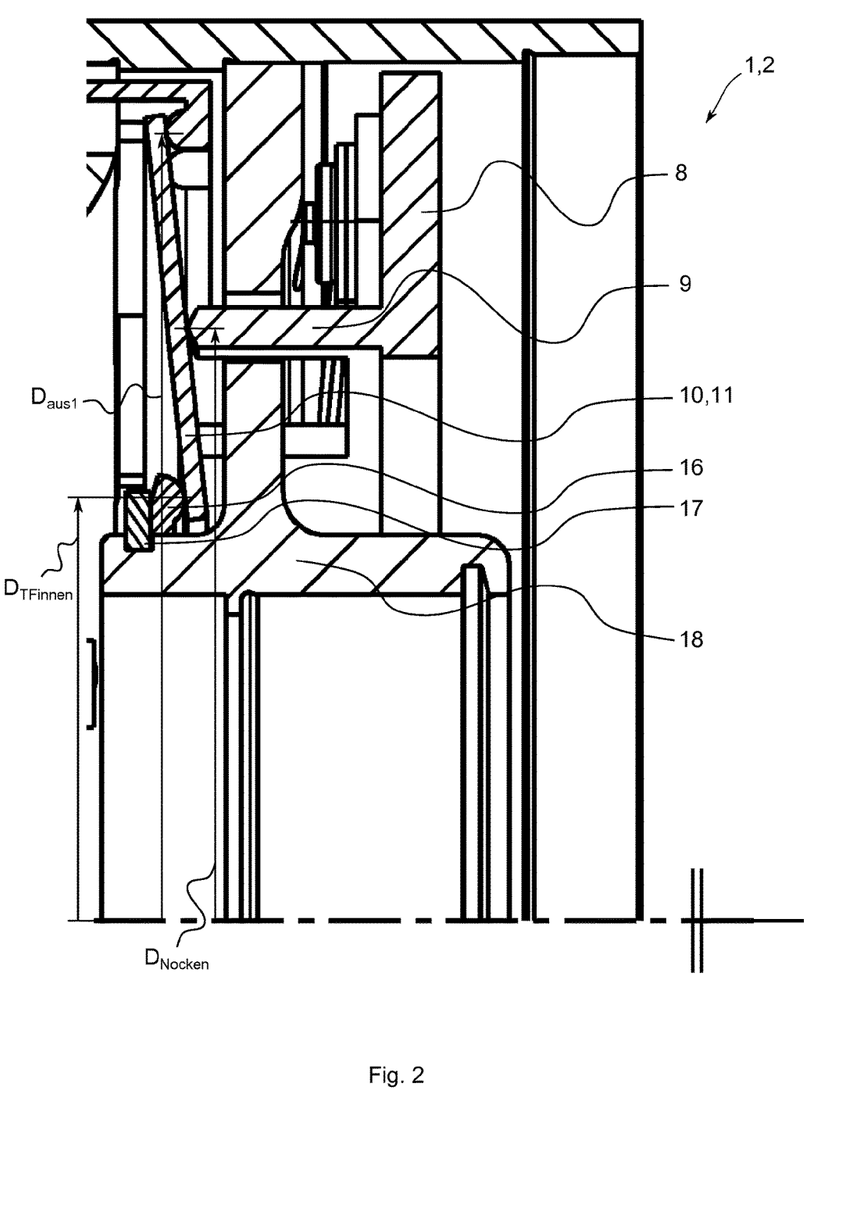
FIG. 2 is an enlarged cross-sectional view of an exemplary embodiment of the hybrid disconnect clutch with a two-stage transmission shown in FIG. 1.

FIG. 2 is an enlarged view of a detail about pressure plate tab 9. Ratio $i_1$ is composed of the diameters of $$\frac{D_{aus1} - D_{TF\_innen}}{D_{Nocken} - D_{TF\_innen}}.$$

Figure 3:
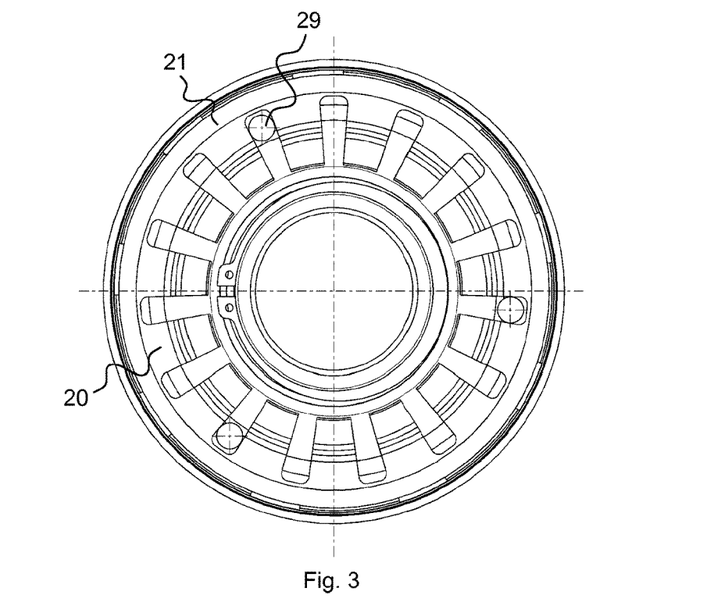
FIG. 3 is a front view of the lever side of the hybrid disconnect clutch with a two-stage transmission.

FIG. 3 illustrates the use of coupling element 21 in cooperation with lever spring 20 and centering bolt 29.

Figure 4:
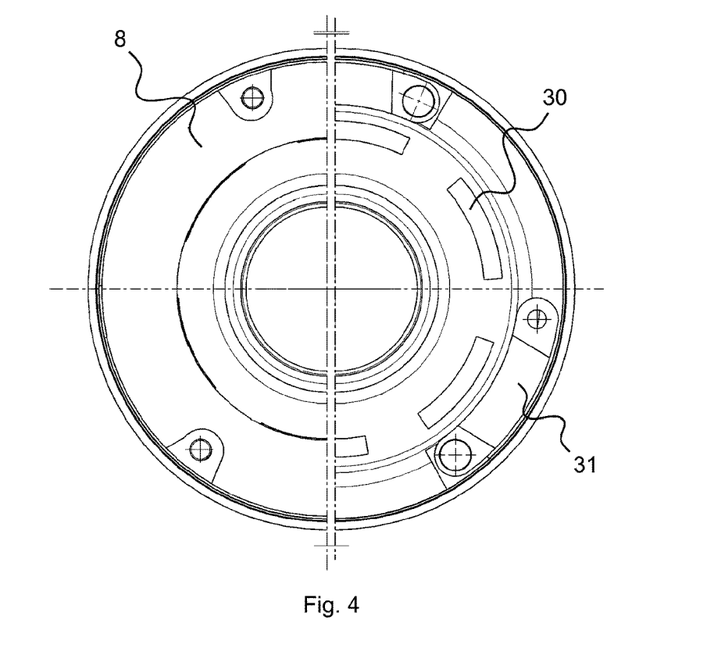
FIG. 4 is a front view of the pressure plate side of the hybrid disconnect clutch.

As shown in FIG. 4, passages 30 provided radially inside leaf springs 31 allow first lever element 10 to contact pressure plate 8 by means of multiple pressure plate tabs 9.

Figure 5:
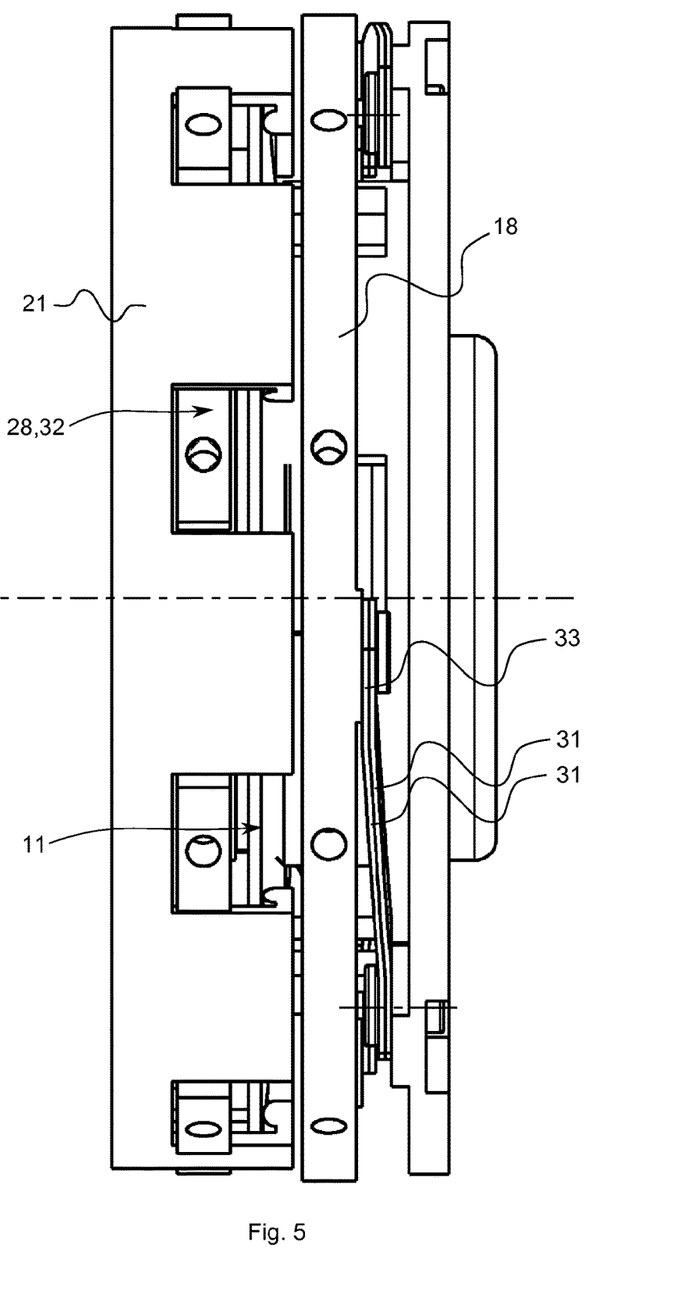
FIG. 5 is a side view of the hybrid disconnect clutch with a two-stage transmission; and, FIG. 6 is a front view of the hybrid disconnect clutch with a two-stage transmission.

As shown in FIG. 5, central flange 18 is disposed adjacent to coupling element 21, generating lever spring bearing surface 32. A number of leaf springs 31 combine to form leaf spring package 33 and apply axial force. Diaphragm spring 11 also applies an axial force. However, these two forces act in opposite directions.

Figure 6:
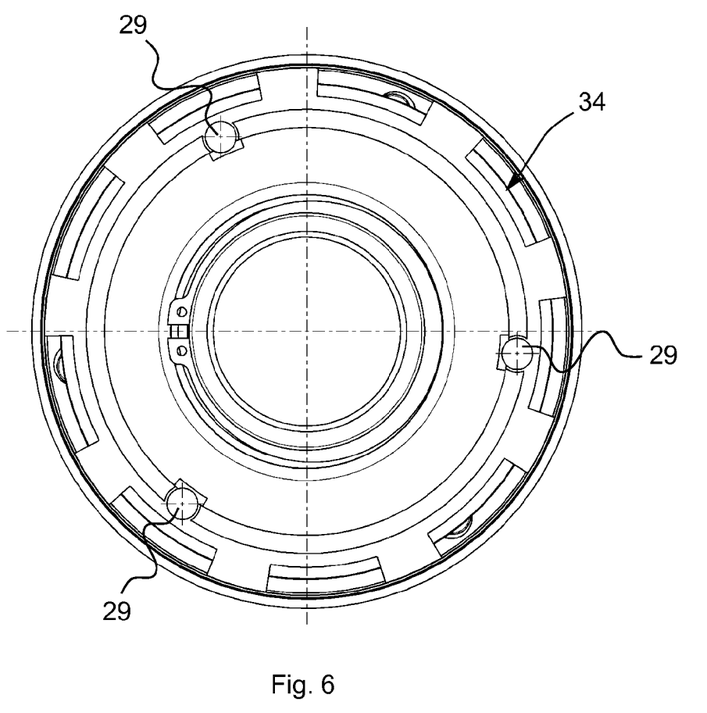

FIG. 6 illustrates the use of three centering bolts 29 designed for being used on lever spring 20. Of course it is also possible to use six or more centering bolts 29. The lever bearing surface has cutouts 34 for coupling element 21.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 1 disconnect clutch
2 hybrid module
3 rotor
4 tube
5 clutch disc
6 friction lining
7 counter plate
8 pressure plate
9 pressure plate tab
10 first lever element
11 diaphragm spring
12 radially inner end of the first lever element
13 radially outer end of the first lever element
14 bearing point
15 dome
16 bearing ring
17 securing ring
18 central flange
19 second lever element
20 lever spring
21 coupling element
22 first contacting region
23 first surface of the first lever element
24 second contacting region
25 radially outer end of the second lever element
26 radially inner end of the lever element
27 actuating device/actuator
28 lever bearing surface/lever bearing ring
29 centering bolt
30 passage
31 leaf spring
32 lever spring bearing surface
33 leaf spring package
34 cutout

What is claimed is:

1. A rotor-integrated disconnect clutch for a hybrid module, comprising:
   a rotor;
   a counter plate;
   a pressure plate axially movable on an axis of rotation;
   a clutch disc arranged to be non-rotatably secured between said counter plate and said pressure plate;
   a first lever element arranged to be pivotable and in a force-transmitting operative connection with said pressure plate via a pressure plate tab;
   an actuator arranged to pivot said first lever element;
   a second lever element arranged to have a force-transmitting connection between said actuator and said first lever element; and
   an annular coupling element having a first contacting region abutting against a radially outer end of said first lever element and having a second contacting region abutting against a radially outer end of said second lever element.

2. The rotor-integrated disconnect clutch recited in claim 1, wherein said second lever element is a spring-elastic element.

3. The rotor-integrated disconnect clutch recited in claim 1, further comprising a bearing ring including a dome abutting against a radially inner end region of said first lever element, defining a bearing point.

4. The rotor-integrated disconnect clutch recited in claim 3, wherein said pressure plate tab is spring-loaded to abut against said first lever element on a side facing away from said second lever element and arranged between said bearing point and said first contacting region.

5. The rotor-integrated disconnect clutch recited in claim 3, wherein said bearing ring is axially fixed to a central flange via a securing ring.

6. The rotor-integrated disconnect clutch recited in claim 1, wherein said annular coupling element is a sleeve adjacent to said rotor, wherein said first and second contacting regions are formed on said sleeve arranged to point towards one another, axially trapping said radially outer ends of said first and second lever elements.

7. The rotor-integrated disconnect clutch recited in claim 1, further comprising a lever bearing ring arranged at the center of said second lever element and axially between said first and second lever elements.

8. The rotor-integrated disconnect clutch recited in claim 1, wherein said first and second lever elements are arranged to implement a two-stage and axially successive clutch transmission.

9. A clutch comprising:
   a rotor;
   a counter plate;
   a pressure plate movable in an axial direction;
   a first lever element arranged to be pivotable and in a force-transmitting operative connection with the pressure plate;
   an actuator arranged to pivot the first lever element;
   a second lever element arranged to have a force-transmitting connection between the actuator and the first lever element; and
   an annular coupling element having a first contacting region contacting a radially outer end of the first lever element and having a second contacting region contacting a radially outer end of the second lever element.

10. The clutch of claim 9, wherein the second lever element is a spring-elastic element.

11. The clutch of claim 9, further comprising a bearing ring including a dome abutting against a radially inner end region of the first lever element, defining a bearing point.

12. The clutch of claim 9, wherein the first lever element is arranged to be pivotable and in a force-transmitting operative connection with the pressure plate via a pressure plate tab.

13. A clutch comprising:
- an axially movable pressure plate;
- a diaphragm spring in force-transmitting operative connection with the pressure plate;
- a lever element;
- an annular coupling element with a first contact region contacting a radially outer end of the diaphragm spring and a second contact region contacting a radially outer end of the lever element; and
- an actuator in a force-transmitting connection with the lever element.

14. The clutch of claim 13, further comprising an actuator contacting a radially inner end of the lever element.

15. The clutch of claim 13, further comprising an axially-fixed bearing ring including a dome abutting against a radially inner end region of the lever element.

16. The clutch of claim 13, wherein the diaphragm spring contacts the pressure plate between a radially inner end of the pressure plate and a radially outer end of the pressure plate.

17. The clutch of claim 13, further comprising a lever bearing ring arranged at a center of said lever element.

\* \* \* \* \*